UNITED STATES PATENT OFFICE.

BERNHARD VON SCHENK, OF HEIDELBERG, GERMANY.

PROCESS OF MAKING POLYSULFIDS.

SPECIFICATION forming part of Letters Patent No. 586,567, dated July 20, 1897.

Application filed October 18, 1895. Serial No. 566,140. (No specimens.)

*To all whom it may concern:*

Be it known that I, BERNHARD VON SCHENK, a subject of the Emperor of Germany, and a resident of Heidelberg, Germany, have invented certain new and useful Improvements in the Manufacture of Polysulfids, of which the following is a specification.

The monosulfid of sodium, generally known as "sulfid of sodium," has for a long time been used commercially for manufacturing purposes. This compound or combination has powerful corrosive properties, while as a dilute solution it exhibits highly-efficient purifying and dissolving properties. The idea of reducing or neutralizing these corrosive properties and of thereby obtaining a substance having a milder action would, therefore, naturally suggest itself, and with this object in view it has been proposed to introduce an increased proportion of sulfur into each one molecule of the said compound. In point of fact I found that the reaction of the pure polysulfids was practically neutral and that they possessed none of the corrosive properties of the monosulfids.

Polysulfids of metals of the alkalies have been obtained by boiling monosulfids with a quantity of sulfur in excess. While this reaction takes place, however, it is accompanied by certain additional or secondary processes which do not offer the least guaranty that the whole of the monosulfid shall be converted into polysulfids. A uniform compound product is not, therefore, obtainable by this method.

I have succeeded in obtaining, according to my invention, liquors or lyes absolutely free from any monosulfid by the process hereinafter described, which consists in bringing about a reaction between the soluble polysulfids of calcium and the carbonates or sulfates of either potassium or sodium, the reaction taking place in accordance with the following equations:

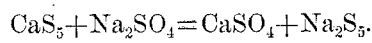
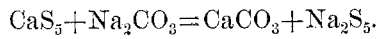

Sulfid of calcium, or, to be strictly accurate, monosulfid of calcium, is a product insoluble in water and one which can only be obtained by a pyrochemical process, whereas polysulfids of calcium, which are readily soluble, may be obtained without difficulty by boiling hydrate of lime in the presence of an excess of sulfur.

By mixing the calcium-polysulfid lyes after cooling with a quantity of soda or potash, predetermined by calculation, the product immediately resulting will be polysulfid of sodium or potassium, (as the case may be,) which may then be decanted off from the underlying precipitate of carbonate of lime.

The following is the process I prefer to employ for preparing these polysulfids, but I do not limit myself to the precise details:

*Process of preparation.*—Thirty (30) kilograms of flowers of sulfur (or sublimed sulfur) are thoroughly mixed with twenty (20) kilograms of hydrated lime, the whole being then ground and sifted through a sieve having, say, four thousand (4,000) meshes per square centimeter, after which it is placed in a boiler containing about one hundred and ten (110) liters of water. The three ingredients are boiled together for two and a half hours, and in the course of the first hour of ebullition, while the boiling liquor still retains its yellow color and frothy condition, further small quantities of water, amounting to ten (10) liters altogether, are added, so as to prevent the mixture from boiling over. The lye obtained after the boiling has been continued for about two and a half hours would be of a muddy grayish-green color and of 48° Baumé specific gravity. This lye is further diluted with boiled water until its specific gravity is reduced to 10° Baumé and then allowed to rest for twelve hours, whereupon the clear sulfur lye, which by that time will have assumed a deep-yellow color, should be decanted. By a further addition of water its specific gravity is then reduced to 5° Baumé. Of the sulfur lye thus obtained fifty (50) liters are again poured into a boiler, with an addition of one hundred (100) kilograms (ninety-five per cent.) of soda or the same amount of calcined potash, as the case may be, the whole being well stirred, decanted, and then allowed to evaporate until it is dry. After evaporation the contents of the boiler are discharged and cooled by exposure to the atmosphere, the product obtained as a result being a yellow, consistent, granular mass, partly in lumps. After cooling the material is sent through a mill, wherein it is ground down to a state of fine division, and then it is passed through a sieve having about three thousand (3,000) meshes per square centimeter. The ground and sifted substance is finally placed in tightly-closed receptacles of wood.

This article of manufacture in the final condition assumes a pure white color with a yellowish shimmer and is then ready for use.

With this product lyes or solutions of different degrees of concentration are prepared, suitable for washing, boiling, and cleaning purposes. They are also particularly serviceable for washing or scouring raw wool, half-wool, and textile fibers generally, and constitute a novel bleaching agent for vegetable fiber.

The specific gravity of a solution of 15° concentration should not exceed 1.158 or $19\frac{1}{2}°$ Baumé.

Having now particularly described the nature of my said invention and in what manner the same is to be performed, I declare that what I claim is—

The herein-described process for the manufacture of polysulfids, the same consisting in combining and thoroughly mixing sublimed sulfur and hydrated lime in about the proportions of sixty per cent. of sulfur and forty per cent. of lime, boiling the mixture in water for a suitable period, reducing the specific gravity of the lye thus obtained by the addition of boiling water to about 10° Baumé, then decanting the lye, then further reducing its specific gravity to about 5° Baumé by the addition of water, then adding an alkali carbonate, then decanting and evaporating the mixture until it is dry, then cooling the dried mixture by exposure to the atmosphere, and finally grinding and sifting the dried mixture, substantially as set forth.

In testimony whereof I have signed my name to this specification in the presence of two subscribing witnesses.

BERNHARD VON SCHENK.

Witnesses:
 ROYAL YOIKAB,
 YOHANNES FISCHER.